US009245174B2

(12) United States Patent
Yuan (10) Patent No.: US 9,245,174 B2
(45) Date of Patent: Jan. 26, 2016

(54) HUMAN FACIAL IDENTIFICATION METHOD AND SYSTEM, AS WELL AS INFRARED BACKLIGHT COMPENSATION METHOD AND SYSTEM

(75) Inventor: Juntao Yuan, Beijing (CN)

(73) Assignee: Hanwang Technology Co., Ltd., Beijing (CN)

( * ) Notice: Subject to any disclaimer, the term of this patent is extended or adjusted under 35 U.S.C. 154(b) by 335 days.

(21) Appl. No.: 13/818,442

(22) PCT Filed: Jun. 13, 2011

(86) PCT No.: PCT/CN2011/075670
§ 371 (c)(1),
(2), (4) Date: Mar. 26, 2013

(87) PCT Pub. No.: WO2012/024961
PCT Pub. Date: Mar. 1, 2012

(65) Prior Publication Data
US 2013/0208953 A1    Aug. 15, 2013

(30) Foreign Application Priority Data

Aug. 24, 2010    (CN) .......................... 2010 1 0261291

(51) Int. Cl.
G06K 9/00    (2006.01)
H05B 37/02    (2006.01)
G06F 3/042    (2006.01)

(52) U.S. Cl.
CPC ........ *G06K 9/00288* (2013.01); *G06K 9/00255* (2013.01); *H05B 37/02* (2013.01); *G06F 3/042* (2013.01)

(58) Field of Classification Search
CPC .. G06K 9/00255; G06K 3/042; G06K 3/0421
See application file for complete search history.

(56) References Cited

U.S. PATENT DOCUMENTS

| 2005/0122308 A1* | 6/2005 | Bell ......................... G06F 3/011 345/156 |
| 2007/0182949 A1* | 8/2007 | Niclass .................... G01C 3/08 356/3 |

(Continued)

FOREIGN PATENT DOCUMENTS

| CN | 201349347 Y | 11/2009 |
| CN | 101596895 A | 12/2009 |

(Continued)

OTHER PUBLICATIONS

International Bureau of WIPO; International Search Report for PCT/CN2011/075670; Aug. 31, 2011; Geneva, Switzerland.

*Primary Examiner* — Bhavesh Mehta
*Assistant Examiner* — Jonathan S Lee
(74) *Attorney, Agent, or Firm* — Michael J. Donohue; Davis Wright Tremaine LLP (57) ABSTRACT

A human facial identification method and system are disclosed, which belong to the mode identification technical field and intend to improve veracity of human facial identification implemented in outdoor environment. The human facial identification method includes: driving a group of infrared lamps by a high frequency pulse signal to generate infrared backlight, collecting identified human facial features in irradiation of the infrared backlight, comparing the collected identified human facial features with a human facial template to complete the human facial identification. A human facial compensation method and system are also disclosed, which are intend to improve luminance of infrared backlight. The technical solutions are mostly applied to the human image identification field.

10 Claims, 4 Drawing Sheets

(56) References Cited

U.S. PATENT DOCUMENTS

| | | | |
|---|---|---|---|
| 2007/0263099 A1* | 11/2007 | Motta | H04N 5/2354 348/222.1 |
| 2008/0069403 A1* | 3/2008 | Breed | 382/104 |
| 2008/0122792 A1* | 5/2008 | Izadi | G06F 3/0421 345/173 |
| 2009/0244288 A1* | 10/2009 | Fujimoto et al. | 348/164 |
| 2011/0037849 A1* | 2/2011 | Niclass et al. | 348/135 |
| 2012/0019165 A1* | 1/2012 | Igaki et al. | 315/294 |

FOREIGN PATENT DOCUMENTS

| | | |
|---|---|---|
| CN | 101753812 A | 6/2010 |
| CN | 101931755 A * | 12/2010 |
| WO | WO 2009124601 A1 * | 10/2009 |
| WO | 2012024961 A1 | 3/2012 |

* cited by examiner

HUMAN FACIAL IDENTIFICATION METHOD AND SYSTEM, AS WELL AS INFRARED BACKLIGHT COMPENSATION METHOD AND SYSTEM

FIELD OF THE INVENTION

The present invention relates to mode identification technology, and in particular to a human facial identification method and system as well as an infrared backlight compensation method and system.

DESCRIPTION OF PRIOR ART

Human facial identification is a novel biological feature identification technology arising with the rapid progress in computer technology, image processing technology, and mode identification technology, etc. The human facial identification technology compares input human facial images with known human facial data with respect to features of the human face so as to identify respective human faces.

The human facial identification technology has been successfully used in areas such as entrance guard system, work attendance checking system, and security monitoring system. Currently, most products are used in indoor environment. The inventor has discovered that the human facial identification in outdoor environment is susceptible to ambient light, thereby deteriorating accuracy of the outdoor human facial identification.

SUMMARY OF THE INVENTION

Embodiments of the present invention provide a human facial identification method and system capable of improving accuracy of the human facial identification in outdoor environment.

Technical solutions according to the embodiments of the present invention are as follows.

A human facial identification method, characterized in that it comprises: generating infrared backlight by driving a group of infrared lamps with a high-frequency pulse signal; collecting features of a human face to be identified under illumination of the infrared backlight; and comparing the collected features of the human face to be identified with human facial templates to identify the human face.

A human facial identification system, characterized in that it comprises: a human facial feature collecting device, a human facial identification device, and an infrared backlight compensation device, wherein the infrared backlight compensation device comprises an infrared backlight driver and a group of infrared lamps arranged on an infrared backlight lamp board, the infrared backlight driver generating a high-frequency pulse signal for driving the group of infrared lamps on the infrared backlight lamp board to provide infrared backlight needed by the human facial feature collecting device; the human facial feature collecting device is configured for collecting features of a human face to be identified under illumination of the infrared backlight; the human facial identification device is configured for comparing the features of the human face to be identified collected by the human facial feature collecting device with human facial templates to identify the human face.

The human facial identification method and system according to the embodiments of the present invention drive the group of infrared lamps with the high-frequency pulse signal to generate the infrared backlight, so that the group of infrared lamps on the infrared backlight lamp board are turned on by a large current lasting a short period and repeating at a high frequency. In this way, the infrared backlight is obtained with a high light intensity. The features of the human face to be identified are then collected under the illumination of the infrared backlight and compared with the human facial templates to identify the human face. Sufficient light is provided for collecting the features of the human face to be identified, which facilitates fast location of the human face by the human facial identification algorithm. Compared with prior art, the present invention can improve accuracy of outdoor human facial identification due to alleviation of influence on the features of the human face to be identified by outdoor light variation.

Further embodiments of the present invention also provide an infrared backlight compensating method and system to increase light intensity of the infrared backlight.

Technical solutions according to the further embodiments of the present invention are as follows.

An infrared backlight compensating method, characterized in that it comprises: generating a high-frequency pulse signal; and driving a group of infrared lamps on an infrared backlight lamp board with the high-frequency pulse signal.

An infrared backlight compensating system, characterized in that it comprises an infrared backlight driver and a group of infrared lamps arranged on an infrared backlight lamp board, wherein the infrared backlight driver is configured for generating a high-frequency pulse signal to drive the group of infrared lamps on the infrared backlight lamp board.

The infrared backlight compensating method and system according to the further embodiments of the present invention drive the group of infrared lamps on the infrared backlight lamp board with the high-frequency pulse signal, so that the group of infrared lamps are turned on by a large current lasting a short period and repeating at a high frequency. In this way, the infrared backlight is obtained with a high light intensity.

BRIEF DESCRIPTION OF THE DRAWINGS

Embodiments of the present invention will be explained in detail with reference to the drawings to provide a thorough explanation of the technical solutions of the embodiments, wherein.

DETAILED DESCRIPTION OF PREFERRED EMBODIMENTS

Next, embodiments of the present invention will be explained thoroughly with reference to the drawings in connection therewith.

Figure 1:
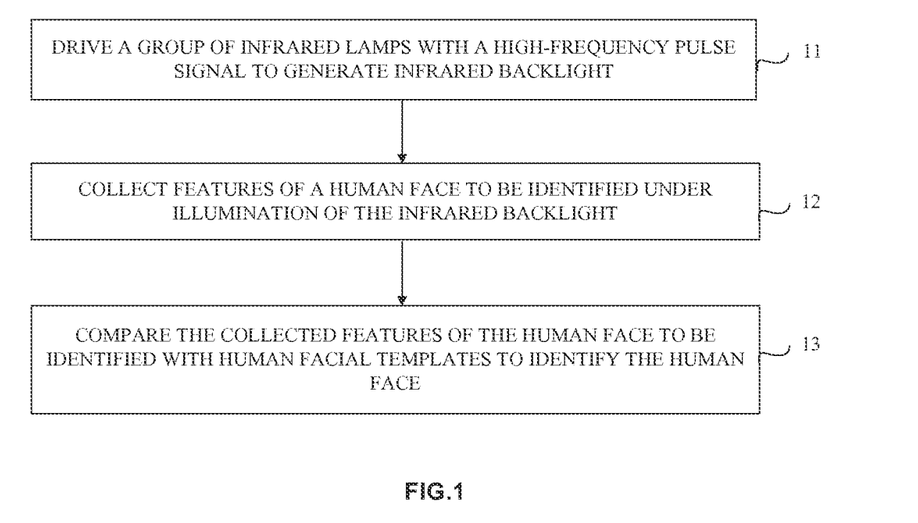
FIG. 1 schematically shows a flow diagram of a human facial identification method provided by an embodiment of the present invention.

As shown in FIG. 1, a human facial identification method provided by an embodiment of the present invention comprises:

in step 11, driving a group of infrared lamps by a high-frequency pulse signal to generate infrared backlight;

in step 12, collecting features of a human face to be identified under illumination of the infrared backlight; and in step 13, comparing the collected features of the human face to be identified with human facial templates to identify the human face.

Prior art infrared backlight uses a group of 840 nm infrared LEDs as the group of infrared lamps, which function as an infrared light source. The group of infrared lamps are arranged on an infrared backlight lamp board and controlled by a Digital Signal Processor (DSP) on signal. The group of infrared lamps can operate stably under a current of 20 mA to achieve light intensity of 6.5 mW/sr. The group of infrared lamps are turned on by the on signal provided by the DSP during human facial identification process and turned off after the process is accomplished. The group of infrared lamps keep in an "on" state during the whole identification process.

Because outdoor ambient light illumination is variable, it is desirable that the human facial identification can respond to variation of the ambient light more rapidly and more accurately, so as to eliminate influence thereof. According to the embodiment of the present invention, the group of infrared lamps on the infrared backlight lamp board are driven by the high-frequency pulse signal having a frequency of 100 Hz-10 KHz. Driven by the high-frequency pulse, the group of infrared lamps can achieve an average light intensity of 300 mW/sr under a current as large as 1000 mA passing through within a very short time period. The light intensity of the group of infrared lamps can increase from 6.5 mW/sr under a constant current of 20 mA to 300 mW/sr. The group of infrared lamps are turned on by the large current lasting a short time period and repeating at a high frequency during the human facial identification process. The group of infrared lamps are turned on when the DSP provides the on signal and turned off after the human facial identification process is accomplished. As a result, the light intensity of the infrared backlight is greatly increased so as to provide sufficient illumination for collecting features of the human face to be identified. This facilitates rapid location of the human face by the human facial identified algorithm.

According to the embodiment of the present invention, the features of the human face to be identified are collected under illumination of the infrared backlight and compared with the human facial templates to identify the human face. The infrared backlight is turned on by the large current lasting a short time period and repeating at a high frequency and thus the light intensity thereof is increased. As a result, influence on the features of the human face to be identified by the variation of the outdoor light can be alleviated and the accuracy of outdoor human facial identification can be increased.

Figure 2:
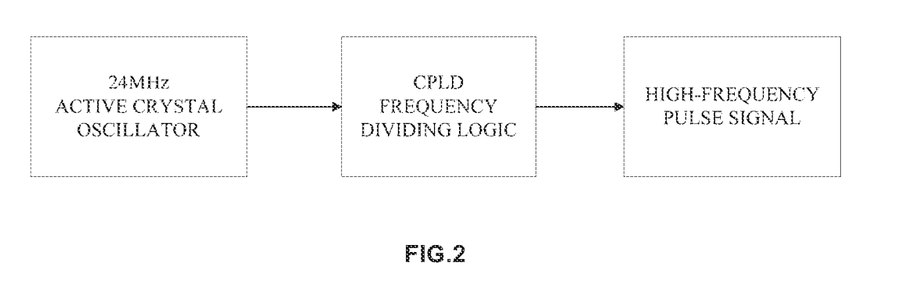
FIG. 2 schematically shows a diagram for generating a high-frequency pulse signal according to the present invention.

FIG. 2 schematically shows a diagram for generating the high frequency pulse signal. An active crystal oscillator generates a clock signal of 24 MHz. Frequency of the clock signal is divided by an internal programmable program of a Complex Programmable Logic Device (CPLD). The 24 MHz clock signal can be converted to the high-frequency pulse signal for driving the group of infrared lamps by adjusting the frequency dividing factor.

Figure 3:
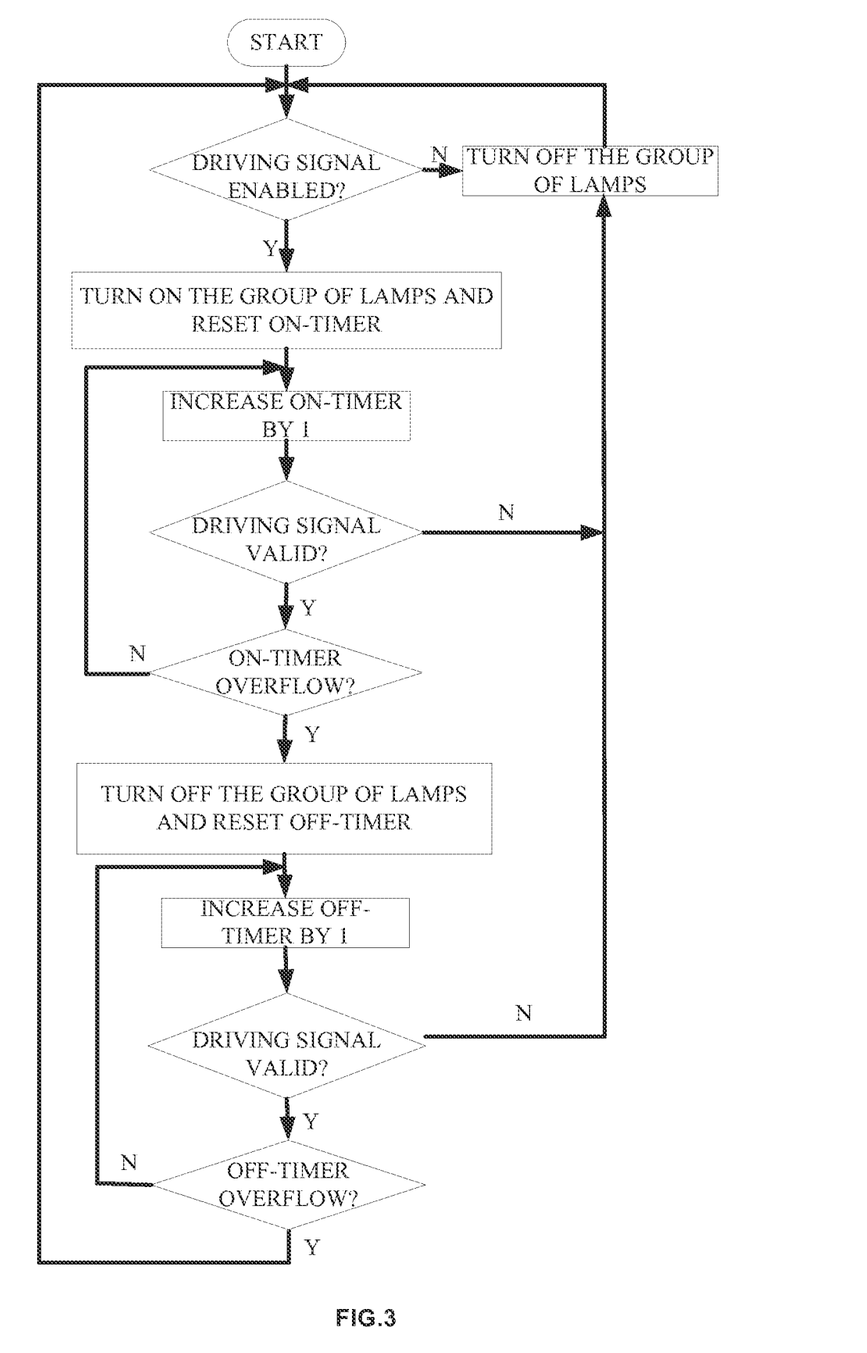
FIG. 3 schematically shows a flow diagram for driving a group of infrared lamps with the high-frequency pulse signal according to the present invention.

FIG. 3 schematically shows a flow for driving the group of infrared lamps with the high-frequency pulse signal. The group of infrared lamps are turned on and meanwhile an on-timer is reset and started when the high-frequency pulse signal switches to a high level. The on-timer keeps time unto it overflows. The group of infrared lamps are turned off and meanwhile off-timer is reset and started when the high-frequency pulse signal switches to a low level. The off-timer keeps time until it overflows. The turning-on and turning-off of the group of infrared lamps are alternately repeated as long as the signal for driving the group of infrared lamps is valid and the group of infrared lamps are turned off when the signal for driving the group of infrared lamps becomes invalid.

Figure 4:
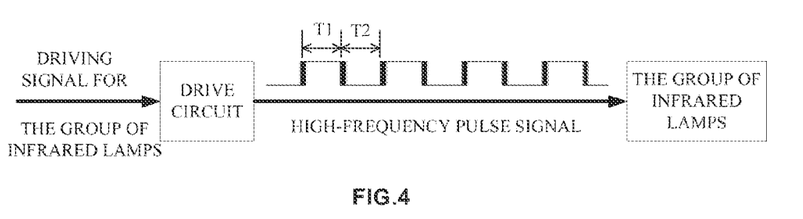
FIG. 4 schematically shows a diagram of the high-frequency pulse signal for driving the group of infrared lamps according to the present invention.

FIG. 4 schematically shows the high-frequency pulse signal for driving the group of infrared lamps. The group of infrared lamps are turned on during a time period T1 and turned off during a time period T2. This process is repeated to enable pulse turning-on. Different pulse frequencies can be achieved by adjusting the driving cycle T (T=T1+T2) of the group of infrared lamps. When T is constant, different light intensity of the infrared backlight can be achieved by adjusting the on period T1 of the group of infrared lamps.

It should be noted that because the frequency of the pulse signal for driving the group of infrared lamps is very high, the group of infrared lamps driving by the high-frequency pulse signal appear to be constantly turned on. Consequently, images collected by the Charge Coupled Device (CCD) camera when collecting the features of the human face to be identified will not flicker.

It should also be noted that because operating current of the infrared LEDs is greatly increased to up to 1000 mA according to the embodiment of the present invention, the on period T1 in the driving cycle T of the group of lamps should be determined according to the specification of the infrared LEDs and should not be too long. T1 is generally shorter than 100 μs. If the on period T1 is too long, the group of infrared lamps will be overheated and may age rapidly or even burn.

It will be understood that the number of the infrared LEDs according to the embodiment of the present invention can be adjusted to satisfy outdoor illumination requirement. The number of the infrared LEDs can be increased from currently 10-20 to a hundred or even more.

In order to further increase operation efficiency of the group of infrared lamps, the human facial identification method provided by embodiments of the present invention may provide a driving output enable signal for the group of infrared lamps at the exposure time point of collecting features of the human face to be identified. In this way, the high-frequency pulse signal for driving the group of infrared lamps is synchronized with an exposure synchronization signal of the CCD camera when collecting the features of the human face to be identified. In other words, the group of infrared lamps are turned on during the exposure period and turned off after the exposure period.

Figure 5:
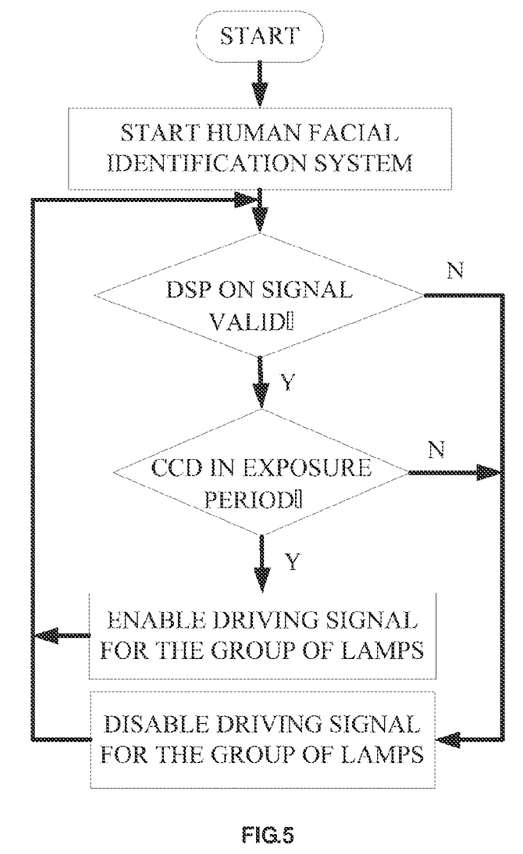
FIG. 5 schematically shows a flow diagram of a method for controlling the high-frequency pulse signal to be synchronized with an exposure synchronization signal according to an embodiment of the present invention.
Figure 6:
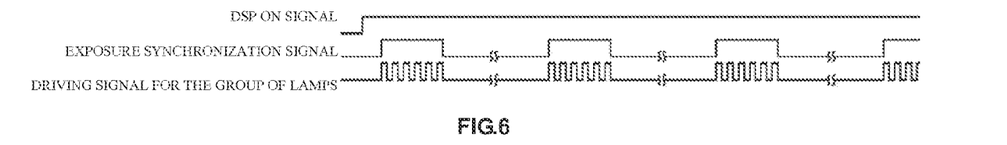
FIG. 6 schematically shows a diagram of a driving signal for the group of infrared lamps after the synchronization according to an embodiment of the present invention.

The group of infrared lamps can be controlled to be turned on during the exposure period and turned off after the exposure period by receiving an exposure synchronization signal when collecting the features of the human face to be identified and controlling the high-frequency pulse signal for driving the group of infrared lamps to be synchronized with the exposure synchronization signal. FIG. 5 schematically shows a method flow for synchronizing the high-frequency pulse signal with the exposure synchronization signal. When the human facial identification system is started, the DSP on signal becomes valid. During the valid period of the DSP on signal, it is determined whether the CCD camera for collecting the features of the human face to be identified is in an exposure period. If the CCD camera is in the exposure period, the driving output enable signal for the group of infrared lamps is set to generate the high-frequency pulse signal for driving the group of infrared lamps. A driving output disable signal is set at an arbitrary time point outside the exposure period. Driving signal for the group of infrared lamps after synchronization is shown in FIG. 5.

It should be noted that the CCD camera is not always in the exposure state during its operation. In contrast, the CCD camera is in the exposure state only when it captures a field of image. Image data thus collected is then output. During the data output process, the ambient light has no influence on the CCD camera. Also, the exposure period is far less than the time period for outputting the image data. In light of this, according to the embodiment of the invention, the driving signal for the group of infrared lamps is synchronized with the exposure synchronization signal of the CCD camera so that the group of infrared lamps are turned on during the exposure period of the CCD and turned off immediately after the exposure period.

The CCD camera outputs a standard TV signal and collects 50 fields of images per second with a cycle of 20 ms per field. Each field has a field black-out period of about 1.5 ms. The exposure time point of the CCD camera is within the field black-out period of each field. In operation, the driving signal for the group of infrared lamps is synchronized with a field black-out signal of the CCD camera. The group of infrared lamps are on only during the whole field black-out period. Thus the group of infrared lamps has a duty cycle of 7.5%, thereby improving the operation efficiency of the group of infrared lamps effectively and reducing heat generated by the group of infrared lamps. Also, the object can be illuminated earlier than the exposure time point due to the synchronization of the driving signal for the group of infrared lamps and the field black-out signal of the CCD camera. This achieves better imaging effect when the CCD camera is collecting the features.

Furthermore, according to an embodiment of the present invention, the CPLD can be used as a main controller of a driving circuit for the group of infrared lamps, in order to achieve an exact synchronization between the high-frequency pulse signal for driving the group of infrared lamps and the exposure synchronization signal. The CPLD has a response time of 10 nm and can be programmed to turn on the group of infrared lamps within the exposure period of the CCD camera accurately.

In the human facial identification method according to the embodiment of the present invention, the infrared backlight is provided by driving the group of infrared lamps on the infrared backlight lamp board by the high-frequency pulse signal. This achieves a high light intensity which satisfies the requirement of outdoor human facial identification and improves accuracy of the outdoor human facial identification. Moreover, the synchronization between the high-frequency pulse signal for driving the group of infrared lamps and the exposure synchronization signal at the time of collecting the features of the human face to be identified can reduce the on period of the group of infrared lamps so as to effectively control the heat generated during operation thereof and prolong the life of the infrared LEDs, which helps long-term stable operation of the system. On the other hand, the object can be illuminated earlier than the exposure time point to achieve better imaging effect.

Moreover, according to an embodiment of the present invention, ambient visible light can be filtered when collecting the features of the human face to be identified. The visible light can be effectively reflected and attenuated by adding an infrared filter in front of the camera for the human facial identification to allow only the infrared light to pass through. In this way, the influence on the human facial identification by the ambient light can be substantially reduced, so that the accuracy of the outdoor human facial identification can be ensured.

It should be noted that although the infrared filter may attenuate the infrared light, the infrared light passing through the infrared filter still have sufficient intensity because it is generated by driving the group of infrared lamps by the high-frequency pulse signal. Therefore, the infrared filter will not affect the accuracy of the outdoor human facial identification.

Figure 7:
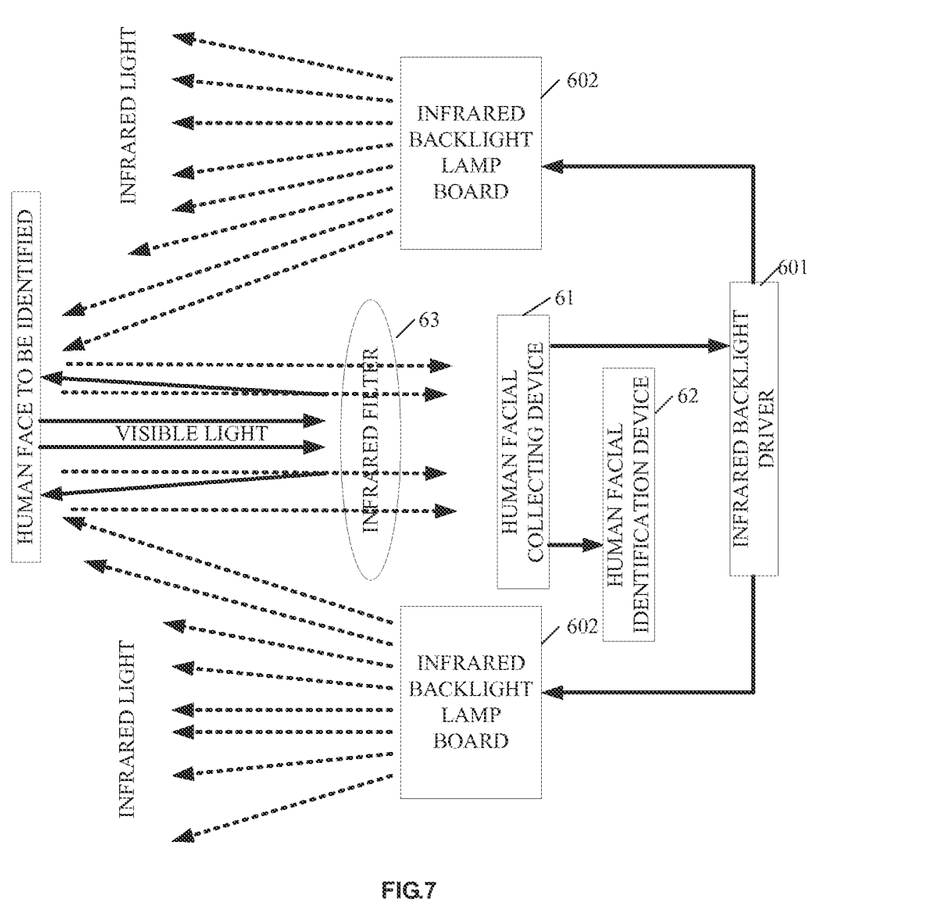
FIG. 7 schematically shows a structural diagram of a human facial identification system provided by an embodiment of the present invention.

FIG. 7 shows a human facial identification system provided by an embodiment of the present invention, comprising a human facial feature collecting device 61, a human facial identification device 62, and an infrared backlight compensation device.

The infrared backlight compensation device comprises an infrared backlight driver 601 and a group of infrared lamps (not shown) arranged on an infrared backlight lamp board 602, the infrared backlight driver 601 being configured for generating a high-frequency pulse signal for driving the group of infrared lamps on the infrared backlight lamp board 602 to provide infrared backlight needed by the human facial feature collecting device 61.

The human facial feature collecting device 61 is configured for collecting features of a human face to be identified under illumination of the infrared backlight. The human facial identification device 62 is configured for comparing the features of the human face to be identified collected by the human facial feature collecting device 61 with human facial templates to identify the human face.

The human facial identification system according to the embodiment of the present invention drives the group of infrared lamps on the infrared light board with the high-frequency pulse signal to generate the infrared backlight, so that the group of infrared lamps on the infrared backlight lamp board are turned on by a large current lasting a short period and repeating at a high frequency. In this way, the infrared backlight is obtained with a high light intensity. Also, sufficient light is provided for collecting the features of the human face to be identified, which facilitates fast location of the human face by the human facial identification algorithm. Compared with prior art, the present invention can improve accuracy of outdoor human facial identification due to alleviation of influence on the features of the human face to be identified by outdoor light variation.

Furthermore, the infrared backlight driver 601 is further configured for receiving an exposure synchronization signal emitted by the human facial feature collecting device 61 and controlling the generated high-frequency pulse signal to be synchronized with the exposure synchronization signal.

The synchronization between the high-frequency pulse signal for driving the group of infrared lamps and the exposure synchronization signal at the time of collecting the features of the human face to be identified can reduce the on period of the group of infrared lamps so as to effectively control the heat generated during operation thereof and prolong the life of the infrared LEDs, which helps long-term stable operation of the system. On the other hand, the object can be illuminated earlier than the exposure time point to achieve better imaging effect.

Moreover, in the human facial identification system according to the embodiment of the present invention, an infrared filter 63 may be arranged in front of the human facial feature collecting device 61 to filter ambient visible light when the human facial feature collecting device is collecting the features of the human face to be identified, so as to alleviate influence on the human facial identification by the ambient light and ensure the accuracy of the human facial identification.

According to an embodiment of the present invention, there is also provided an infrared backlight compensating method, characterized in that it comprises: generating a high-frequency pulse signal; and driving a group of infrared LEDs on an infrared backlight lamp board with the high-frequency pulse signal.

According to an embodiment of the present invention, the infrared backlight compensating method may further comprise: receiving an exposure synchronization signal emitted upon collecting features of an object to be identified; and controlling the high-frequency pulse signal to be synchronized with the exposure synchronization signal.

According to an embodiment of the present invention, there is also provided an infrared backlight compensating system, characterized in that it comprises an infrared backlight driver and a group of infrared LEDs arranged on an infrared backlight lamp board, wherein the infrared backlight driver is configured for generating a high-frequency pulse signal to drive the group of infrared LEDs on the infrared backlight lamp board.

The infrared backlight driver may further be configured for receiving an exposure synchronization signal emitted upon collecting features of an object to be identified and controlling the high-frequency pulse signal to be synchronized with the exposure synchronization signal.

The infrared backlight compensating method and system according to the embodiments of the present invention drive the group of infrared lamps on the infrared light board with the high-frequency pulse signal to generate the infrared backlight, so that the group of infrared lamps are turned on by a large current lasting a short period and repeating at a high frequency. In this way, the infrared backlight is obtained with a high light intensity. The synchronization between the generated high-frequency pulse signal and the exposure synchronization signal at the time of collecting the features of the object to be identified can reduce the on period of the group of infrared lamps so as to effectively control the heat generated during operation thereof and prolong the life of the infrared LEDs, which helps long-term stable operation of the system. On the other hand, the object can be illuminated earlier than the exposure time point to achieve better imaging effect.

Those skilled in the art will understand that the infrared compensation method and system according to the embodiments of the present invention can be applied to any object identification process under the illumination of the infrared light except for the human facial identification. The infrared compensation method and system according to the embodiments of the present invention can provide sufficient light to illuminate the object to be identified so as to reduce the influence on the object to be identified by variation of ambient light and improve accuracy of outdoor object identification.

The above-described embodiments are not intended to limit the scope of the present invention. It is possible to drive some of a plurality of (e.g., two) groups of infrared lamps with the high-frequency pulse signal while drive the others with constant small current as in the prior art. Those skilled in the art will understand that any modification, substitution or improvement without departing from the spirit of the present invention will fall in the scope of the present invention.

What is claimed is:

1. A human facial identification method, characterized in that it comprises:
   driving a group of infrared lamps with a high-frequency pulse signal to generate infrared backlight;
   collecting features of a human face to be identified under illumination of the infrared backlight by a human facial feature collecting device; and
   comparing the collected features of the human face to be identified with human facial templates to identify the human face, wherein
   the high-frequency pulse signal is synchronized with a field black-out signal in such a way that the group of infrared lamps are on only during a whole field black-out period of the human facial feature collecting device; and
   an exposure time point of the human facial feature collecting device is within the field black-out period.

2. The human facial identification method according to claim 1, characterized in that it further comprises generating the high-frequency pulse signal before driving the group of infrared lamps with the high-frequency pulse signal to generate the infrared backlight, wherein generating the high-frequency pulse signal comprises:
   generating a clock signal by an active crystal oscillator; and
   generating the high-frequency pulse signal by dividing a frequency of the clock signal.

3. The human facial identification method according to claim 1, characterized in that driving the group of infrared lamps by the high-frequency pulse signal to generate the infrared backlight comprises:
   turning on the group of infrared lamps when the high-frequency pulse signal switches to a high level;
   resetting and starting an on-timer, the on-timer keeping time until it overflows;
   turning off the group of infrared lamps when the high-frequency pulse signal switches to a low level;
   resetting and starting an off-timer, the off-timer keeping time until it overflows;
   repeating the turning-on and turning-off of the group of infrared lamps alternately as long as a signal for driving the group of infrared lamps is valid and turning off the group of infrared lamps when the signal for driving the group of infrared lamps becomes invalid.

4. The human facial identification method according to claim 1, characterized in that when the high-frequency pulse signal has a constant cycle, brightness of the infrared backlight is adjusted by adjusting the on period of the group of infrared lamps.

5. The human facial identification method according to claim 1, characterized in that it further comprises:
   filtering ambient visible light upon collecting the features of the human face to be identified.

6. A human facial identification system, characterized in that it comprises a human facial feature collecting device, a human facial identification device, and an infrared backlight compensation device, wherein:
   the infrared backlight compensation device comprises an infrared backlight driver and a group of infrared lamps arranged on an infrared backlight lamp board, the infrared backlight driver being configured for generating a high-frequency pulse signal for driving the group of infrared lamps on the infrared backlight lamp board to provide infrared backlight needed by the human facial feature collecting device;

the human facial feature collecting device is configured for collecting features of a human face to be identified under illumination of the infrared backlight; and the human facial identification device is configured for comparing the features of the human face to be identified collected by the human facial feature collecting device with human facial templates to identify the human face, wherein the high-frequency pulse signal is synchronized with a field black-out signal in such a way that the group of infrared lamps are on only during a whole field black-out period of the human facial feature collecting device; and an exposure time point of the human facial feature collecting device is within the field black-out period.

7. The human facial identification system according to claim 6, characterized in that it further comprises an infrared filter configured for filtering ambient visible light upon collecting the features of the human face to be identified by the human facial feature collecting device.

8. An infrared backlight compensating method, characterized in that it comprises:

generating a high-frequency pulse signal; and driving a group of infrared lamps on an infrared backlight lamp board with the high-frequency pulse signal, wherein the high-frequency pulse signal is synchronized with a field black-out signal in such a way that the group of infrared lamps are on only during a whole field black-out period of a human facial feature collecting device; and an exposure time point of the human facial feature collecting device is within the field black-out period.

9. An infrared backlight compensating system, characterized in that it comprises an infrared backlight driver and a group of infrared lamps arranged on an infrared backlight lamp board, wherein the infrared backlight driver is configured for generating a high-frequency pulse signal for driving the group of infrared lamps on the infrared backlight lamp board;

the high-frequency pulse signal is synchronized with a field black-out signal in such a way that the group of infrared lamps are on only during a whole field black-out period of a human facial feature collecting device; and an exposure time point of the human facial feature collecting device is within the field black-out period.

10. The infrared backlight compensating system according to claim 9, characterized in that the infrared backlight driver is further configured for receiving an exposure synchronization signal emitted upon collecting features of an object to be identified and controlling the high-frequency pulse signal to be synchronized with the exposure synchronization signal.

* * * * *